United States Patent
Kirihata (10) Patent No.: US 10,108,887 B2
(45) Date of Patent: Oct. 23, 2018

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Daiji Kirihata, Ushiku (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/366,881

(22) Filed: Dec. 1, 2016

(65) Prior Publication Data

US 2017/0169318 A1 Jun. 15, 2017

(30) Foreign Application Priority Data

Dec. 11, 2015 (JP) ................... 2015-242648

(51) Int. Cl.
*G06K 15/00* (2006.01)
*G06K 15/02* (2006.01)
*H04N 1/00* (2006.01)

(52) U.S. Cl.
CPC ....... *G06K 15/404* (2013.01); *G06K 15/1886* (2013.01); *G06K 15/4095* (2013.01); *H04N 1/00639* (2013.01); *H04N 2201/0094* (2013.01)

(58) Field of Classification Search
CPC ............ G06K 15/404; G06K 15/1886; G06K 15/4095; H04N 1/00639; H04N 2201/0094

USPC ........................................................ 358/1.15
See application file for complete search history.

(56) References Cited

U.S. PATENT DOCUMENTS

| 7,023,571 | B2 * | 4/2006 | Shimada | ................. G06K 15/00 347/19 |
| 2005/0275869 | A1 * | 12/2005 | Yokoyama | ............. G06Q 10/10 358/1.14 |
| 2007/0231037 | A1 | 10/2007 | Iida et al. | |
| 2008/0008491 | A1 | 1/2008 | Tao et al. | |
| 2015/0116754 | A1 * | 4/2015 | Mukai | ................... G06F 3/1288 358/1.14 |

FOREIGN PATENT DOCUMENTS

| JP | 10-198105 | 7/1998 |
| JP | 2001-315414 | 11/2001 |
| JP | 2005-17692 | 1/2005 |
| JP | 5766236 | 8/2015 |

* cited by examiner

Primary Examiner — Kent Yip
(74) Attorney, Agent, or Firm — Fitzpatrick, Cella, Harper & Scinto (57) ABSTRACT

A print apparatus is provided that executes a print using print data that is stored in the apparatus, and in addition to executing post-processing on output materials after the printing, deletes the corresponding print data when processing of the print job ends. Here, the print apparatus according to the embodiment deletes the corresponding print data only in a case when the post-processing to all the sheets or the like set in one print job successfully ends.

9 Claims, 12 Drawing Sheets

IMAGE PROCESSING APPARATUS, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium comprising a function for post-processing such as stapling.

Description of the Related Art

In Japanese Patent Laid-Open No. 2005-17692, control for, in a case where a limit is exceeded when there is a limit to the number of sheets that can be bound by stapling, outputting without performing stapling or cancelling part way through is proposed. Also, there are print apparatuses that comprise a storage area capable of saving print data according to a print job, and that are able to print saved print data. Furthermore, there are print apparatuses in which, as an improvement from the perspective of security or to delete usage capacity, it is possible to select whether or not to delete print data that is saved in a storage area from the storage area after a print completion, and that delete the print data saved in the storage area after a print completion if deletion is selected.

However, there is a problem as is recited below in the foregoing conventional techniques. For example, cases are envisioned in which printing is performed with a setting to delete the print data after the print completion including a post-processing setting such as for stapling in a printing of saved print data. In such a case, in the conventional technique, even in a case when printing completes without post-processing being executed, the corresponding print data is deleted. Here, although a user may consider printing again by performing different settings for the same print job since the post-processing that the user set was not performed on the printed output article, reprinting by using the previously used print data cannot be performed because the print data was deleted. In such a case, it is necessary that the user perform once again a saving of the print data of the same print job, and effort is required to acquire a desired print material.

SUMMARY OF THE INVENTION

The present invention enables realization of an arrangement for maintaining security while effectively using memory resources by suitably deleting corresponding print data after printing in accordance with an execution result of post-processing to the print material and enables reprinting the print data used.

One aspect of the present invention provides an image processing apparatus that uses a storage unit configured to store print data, an image forming unit configured to execute print processing that performs an image formation on a sheet based on print data, and a stapler unit configured to perform stapling processing to a plurality of print processed sheets, comprising: a control unit, having a processor that executes instructions stored in a memory or having circuitry, configured to: accept a print instruction for performing printing of print data comprising a plurality of pages stored in the storage unit, and then perform stapling processing, and in which it is possible to designate automatic deletion of print data after printing; cause the image forming unit to start print processing based on the print data in accordance with the print instruction; and cause, based on print processing not completing even though image formation is performed on sheets that exceed a predetermined number of sheets, the stapler unit not to staple, and cause the storage unit not to delete the print data independently of whether or not an automatic deletion is designated in the print instruction.

Another aspect of the present invention provides a method of controlling an image processing apparatus that uses a storage unit configured to store print data, an image forming unit configured to execute print processing that performs an image formation on a sheet based on print data, and a stapler unit configured to perform stapling processing to a plurality of print processed sheets, wherein the method of controlling includes the following processes which are executed by a control unit arranged in the image processing apparatus having a processor that executes instructions stored in a memory or having circuitry, configured to: accept a print instruction for performing printing of print data comprising a plurality of pages stored in the storage unit, and then perform stapling processing, and in which it is possible to designate automatic deletion of print data after printing; cause the image forming unit to start print processing based on the print data in accordance with the print instruction; and cause, based on print processing not completing even though image formation is performed on sheets that exceed a predetermined number of sheets, the stapler unit not to staple, and cause the storage unit not to delete the print data independently of whether or not an automatic deletion is designated in the print instruction.

Still another aspect of the present invention provides a non-transitory computer-readable storage medium storing a program for causing a computer to execute each step of a method of controlling an image processing apparatus that uses a storage unit configured to store print data, an image forming unit configured to execute print processing that performs an image formation on a sheet based on print data, and a stapler unit configured to perform stapling processing to a plurality of print processed sheets, wherein the method of controlling includes the following processes which are executed by a control unit arranged in the image processing apparatus having a processor that executes instructions stored in a memory or having circuitry, configured to: accept a print instruction for performing printing of print data comprising a plurality of pages stored in the storage unit, and then perform stapling processing, and in which it is possible to designate automatic deletion of print data after printing; cause the image forming unit to start print processing based on the print data in accordance with the print instruction; and cause, based on print processing not completing even though image formation is performed on sheets that exceed a predetermined number of sheets, the stapler unit not to staple, and cause the storage unit not to delete the print data independently of whether or not an automatic deletion is designated in the print instruction.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Configuration of a Print Apparatus>

Figure 1:
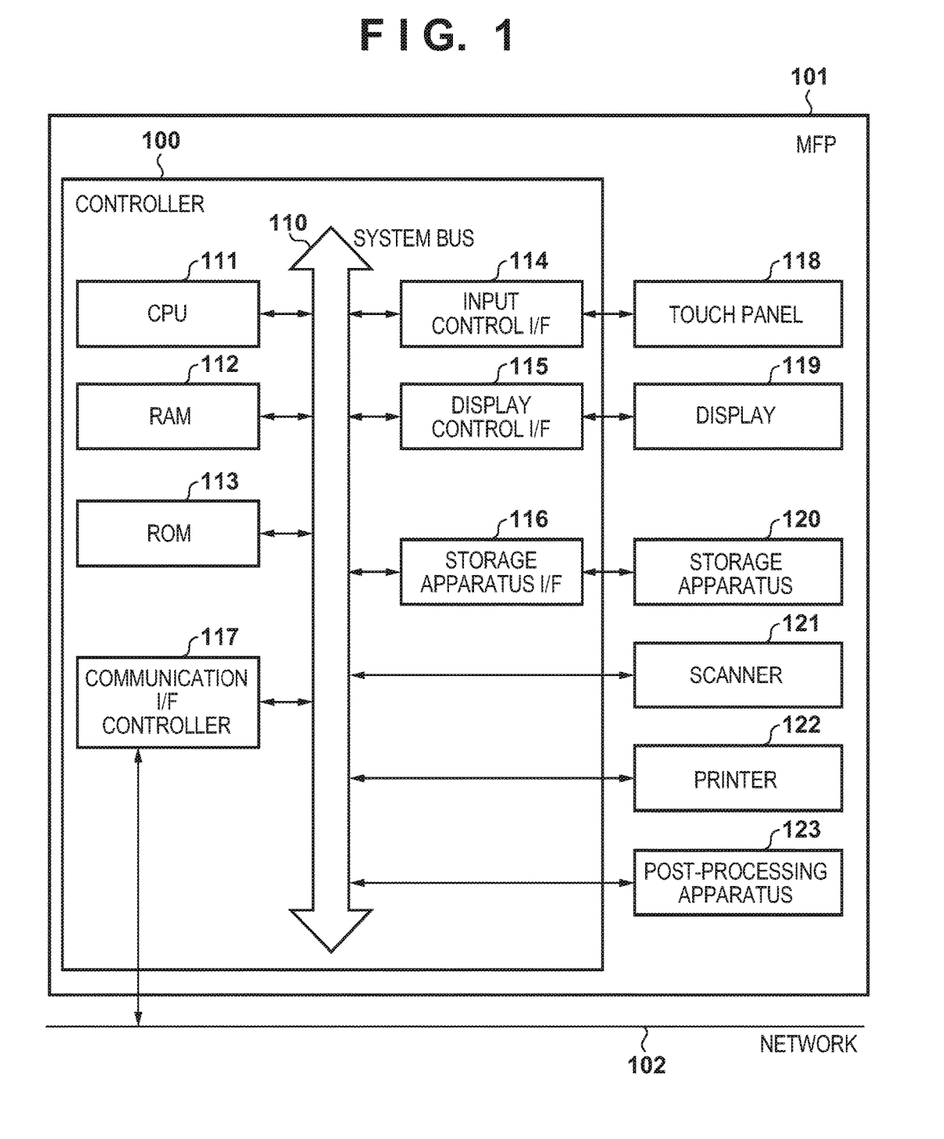
FIG. 1 is a view illustrating an example of a hardware configuration of an MFP 101.

Firstly, a configuration of a print apparatus (an image processing apparatus) according to an embodiment of the present invention is described with reference to FIG. 1. Here, a description is given using an MFP (Multi Function Peripheral) 101 as an example of a print apparatus.

The MFP 101 comprises a controller 100, a touch panel 118, a display 119, a storage apparatus 120, a scanner 121, a printer 122, and a post-processing apparatus 123. Note, the post-processing apparatus 123 may be configured to be connectable to the MFP 101 as an option.

In the controller 100, a CPU 111, a RAM 112, a ROM 113, an input control I/F 114, a display control I/F 115, a storage apparatus I/F 116, and a communication I/F controller 117 are connected to a system bus 110. Also, the scanner 121 and the printer 122 are connected to the system bus 110. Each unit connected to the system bus 110 is configured to be able to perform a mutual exchange of data via the system bus 110.

The CPU (Central Processing Unit) 111 is an apparatus for controlling each apparatus and performing calculation/processing of data. The RAM (Random Access Memory) 112 is a volatile memory and is used as a main memory of the CPU 111, a temporary storage area such as a work area, and the like. The ROM (Read Only Memory) 113 is a non-volatile memory, and image data and other data, and various programs by which the CPU 111 operates are stored in respective predetermined regions. The CPU 111 controls each unit of the MFP 101 using the RAM 112 as a work memory in accordance with a program stored in the ROM 113, for example. Note, the programs by which the CPU 111 operates are not limited to being stored in the ROM 113, and may be stored in the storage apparatus 120.

The input control I/F 114 accepts a user operation, generates a control signal in accordance with the operation, and supplies it to the CPU 111. For example, the input control I/F 114 is connected to a character information input device such as a keyboard (not shown), hard keys for directly inputting a numeric value, and the like, or a pointing device such as the touch panel 118 as an input device which accepts a user operation. Note, the touch panel 118 is an input device that outputs coordinate information in accordance with the position of contact to the input unit configured in a plane, for example. Below, in the present embodiment, although a description is given by an operation on a touch panel, it goes without saying limitation is not made to this. The CPU 111 comprehensively controls each unit of the MFP 101 in accordance with a program based on a control signal generated by and supplied from the input control I/F 114 in response to a user operation that is performed to the input device. By this, it is possible to cause the MFP 101 to perform an operation in response to the user operation.

The display control I/F 115 outputs a display signal for causing an image to display on the display 119. For example, the CPU 111 supplies a display control signal generated in accordance with a program to the display control I/F 115. The display control I/F 115 generates a display signal based on the display control signal and outputs to the display 119. For example, the display control I/F 115 causes the display 119 to display a GUI screen to configure a GUI (Graphical User Interface) based on the display control signal which the CPU 111 generates. Also, the touch panel 118 may be configured in the display 119 integrally. For example, the touch panel 118 is configured such that the transmittance of light does not block the display of the display 119 and it is attached to the upper layer of display screen of the display 119. Then, input coordinates in the touch panel 118 and display coordinates on the display 119 are associated. By this, it is possible to configure a GUI such that a user can operate the screen directly displayed on the display 119.

The storage apparatus 120 such as an HDD (Hard Disk Drive) or a flash memory for example are connected to the storage apparatus I/F 116. A read of the data from the storage apparatus 120 or a write of the data to the storage apparatus 120 is performed based on a control of the CPU 111. The storage apparatus 120 may be used in place of the RAM 112 or the ROM 113.

The communication I/F controller 117 performs communication with each type network such as LAN, Internet, wired, or wireless for example based on control by the CPU 111. Various apparatuses, such as a PC, another MFP, a printer, a server, or the like, are connected to a network 102 and able to communicate with the MFP 101.

The scanner 121 reads an original and generates image data based on the control of the CPU 111. For example, the CPU 111 causes the scanner 121 to execute scan processing by a user instruction inputted via the input control I/F 114. The scanner 121 reads an original placed in an original platen or an ADF (not shown), and digitizes it to generate image data. Then, the scanner 121 stores the generated image data to the storage apparatus 120 via the storage apparatus I/F 116.

The printer 122 performs processing for printing the image data (print data) saved in the storage apparatus 120 based on the control of the CPU 111. For example, the CPU 111 causes the printer 122 to execute the print processing upon a user instruction input via the input control I/F 114 and a command instruction input from an external apparatus via the communication I/F controller 117, or the like. The printer 122 supplies paper from one or more paper supply unit (not shown) and prints on the paper. For the paper supply unit, there exists a cassette supply which can supply paper of a specific size such as A4 and A5 collectively in large amounts, and a manual feed supply in which paper is mounted by a person manually. The printer 122 reads the image data from the storage apparatus 120, converts it to a printable data format, and text prints it on a paper original which is a printing medium.

The post-processing apparatus 123 performs post-processing such as stapling, punching, binding processing, folding, and trimming based on the control of the CPU 111. For example, the CPU 111 causes the post-processing apparatus 123 to execute post-processing upon a user instruction input via the input control I/F 114 and a command instruction input from an external apparatus via the communication I/F controller 117, or the like. In the post-processing apparatus 123, a stapling device, a hole punching device, a folding device, a cutting device, and the like (not shown) are included and these are used so that post-processing is performed on the paper original that the printer 122 output.

In the MFP 101, there exists one or more functions such as copy, transmission, and fax (hereinafter referred to as a function), and a sequence of processing that is performed for a respective function of the printing apparatus such as scan, print, transmission, and copy is made to be a job. For example, a transmission job performs a sequence of processing until an original is read and transmitted from the scanner 121, and a print job is a sequence of processing for printing an original in the printer 122. In the present embodiment, the transmission job is assumed to be of a sequence of processing that reads an original from the scanner 121 and transmits a FAX or an email, for example, but it may be of a form separated from processing for scanning.

<Print Data>

Figure 2:
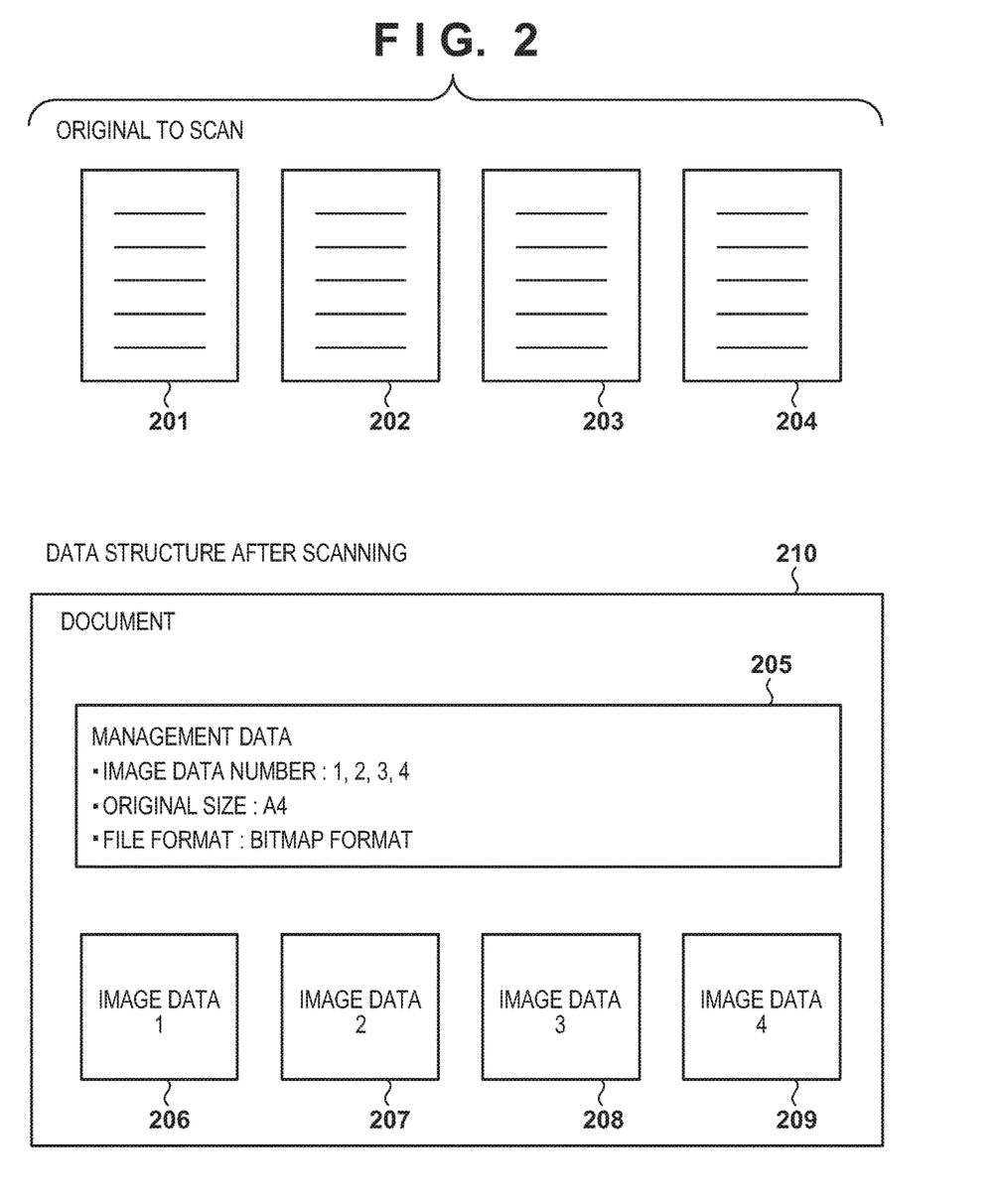
FIG. 2 is a view illustrating an example of a data structure of print data saved in a storage apparatus.

Next, description will be given regarding a data structure of print data saved in the storage apparatus 120 with reference to FIG. 2. In the present embodiment, 4 sheets of originals 201, 202, 203, and 204 of A4 size are scanned by the scanner 121 and data when they are saved in the storage apparatus 120 will be described in an example.

The saved print data is referred to as document 210, and the document 210 comprises management data 205 and image data 206, 207, 208, and 209. The image data is saved as one piece of data in every original read, and in the present embodiment, the original 201 becomes the image data 206, the original 202 becomes the image data 207, the original 203 becomes the image data 208, and the original 204 becomes the image data 209. Also, for each piece of image data, a management number is added for uniquely specifying the image data within the MFP 101 when saved. In an example of the present embodiment, the number of the image data 206 is 1, the image data 207 is 2, the image data 208 is 3, and the image data 209 is 4.

Information necessary in order to use the image data saved in the management data 205 by a print function, a function for transmitting to an external apparatus or the like is included. In the present embodiment, the image data numbers of the management targets are held in order to group the read originals all at once, and the management numbers 1, 2, 3, and 4 are saved. Also, information of the size of the originals and file format information of each piece of image data is held, and in the present embodiment the size of the originals are A4 and the file format is a bitmap format.

<Setting Screen>

Figure 3:
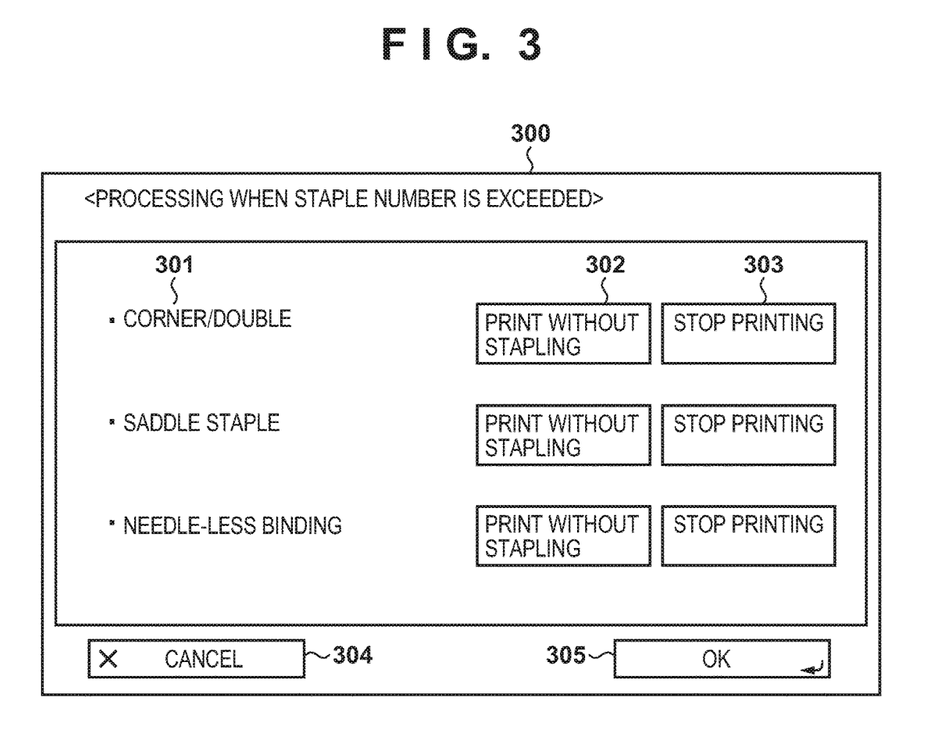
FIG. 3 is a view illustrating an example of a setting screen of a process when a stapling sheet number is exceeded.

Next, description will be given regarding a setting screen displayed on the display 119 in a case when a stapling sheet number exceeds the upper limit sheet number with reference to FIG. 3. A setting screen 300 is a screen displayed on the display 119 when a user operates the touch panel 118 and performs an operation which changes a setting for processing (restriction information) in a case when the stapling sheet number exceeds the upper limit sheet number. In the setting screen 300, a selection of processing at a time when the restriction of the number of sheets is exceeded is possible regarding a function, for which there is a restriction on the number of sheets, displayed in a function display portion 301. It is possible to set control in a case when the upper limit sheet number is exceeded for each function as illustrated in FIG. 3. In the setting screen 300, whether or not a print is continued in a case when the upper limit sheet number is exceeded is set and post-processing itself is not executed in a case when the upper limit sheet number is exceeded.

When the setting screen 300 is displayed, the CPU 111 reads the saved information regarding each function and either button 302 or 303 is displayed in a previously selected state. Here, the user selects a button of reference numeral 302 or 303 of each function as necessary, and it is saved as restriction information in the storage apparatus 120 according to the CPU 111 upon pressing of an OK button 305. The data saved as the restriction information is saved as a table of settings for processing at a time when the stapling sheet number is exceeded as indicated in Table 1 below. Note that in the present embodiment, the upper limit sheet number of each function cannot be input but is set as the default value. However, the present invention is not limited to this, and an operator may control to change the upper limit sheet number. Also, the information selected so far is discarded by pressing a cancel button 304 and a separate function screen is transitioned to from the setting screen 300 if the setting is not desired to be saved.

TABLE 1

| | PRINT WITHOUT STAPLING OR CANCEL PRINT | MAX NUMBER OF SHEETS |
|---|---|---|
| CORNER/DOUBLE | PRINT WITHOUT STAPLING | 50 |
| SADDLE STITCHING | PRINT WITHOUT STAPLING | 20 |
| NEEDLE-LESS STAPLING | CANCEL PRINT | 5 |

TABLE 1—table for setting of processing for when stapling number of sheets is exceeded Here, a job completes without stapling although output is continued when the number of output sheets of the print job for which the corresponding function is set exceeds the upper limit sheet number in a case when a setting of print without stapling of reference numeral 302 is performed. Also, a print output is cancelled when the number of output sheets of the print job for which the corresponding function is set exceeds the upper limit sheet number and the print job ends without stapling if the setting of print cancellation of reference numeral 303 is performed. Note that in the present embodiment, although a stapling function is described in one example as post-processing, the present invention is not limited to this and at the least application to post-processing such as punching, binding processing, folding processing, sheet cutting processing, and the like is possible. It is desirable to store in advance in the ROM 113 or the like a table which defines an upper limit sheet number for each type, similar to the case of the stapling, in the case of application to these post-processes.

<Print Screen>

Figure 4A:
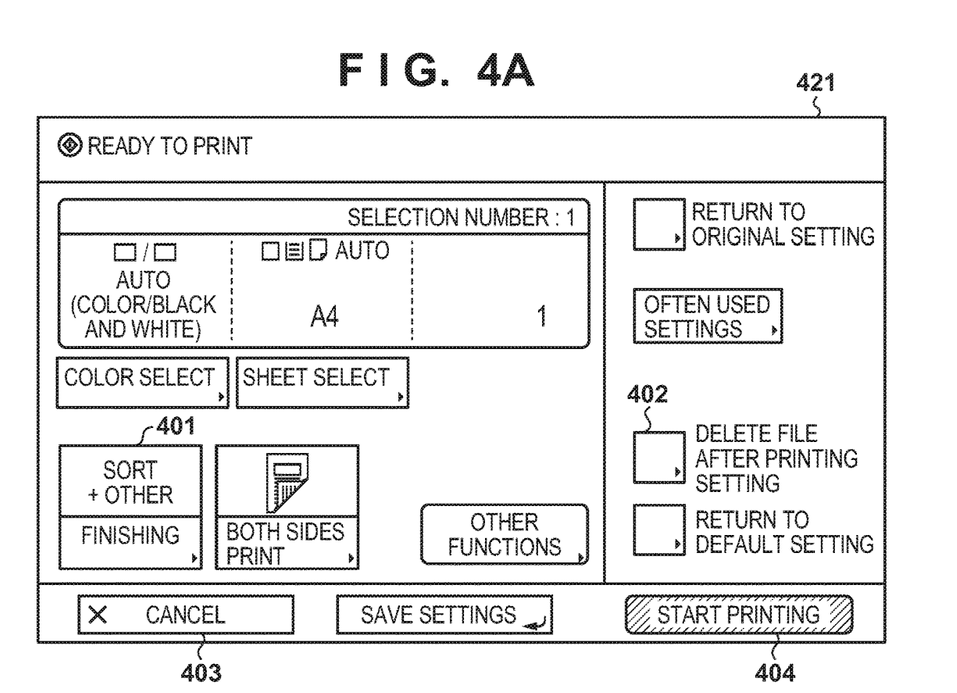
FIGS. 4A and 4B are views illustrating an example of a main screen for printing and a finish setting screen.
Figure 4B:
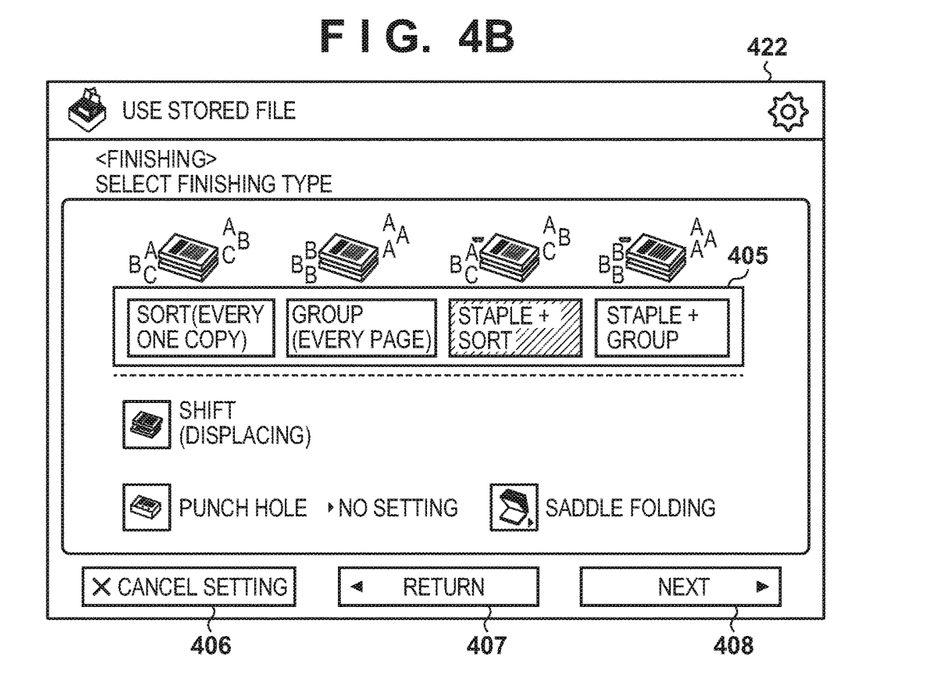
Figure 4C:
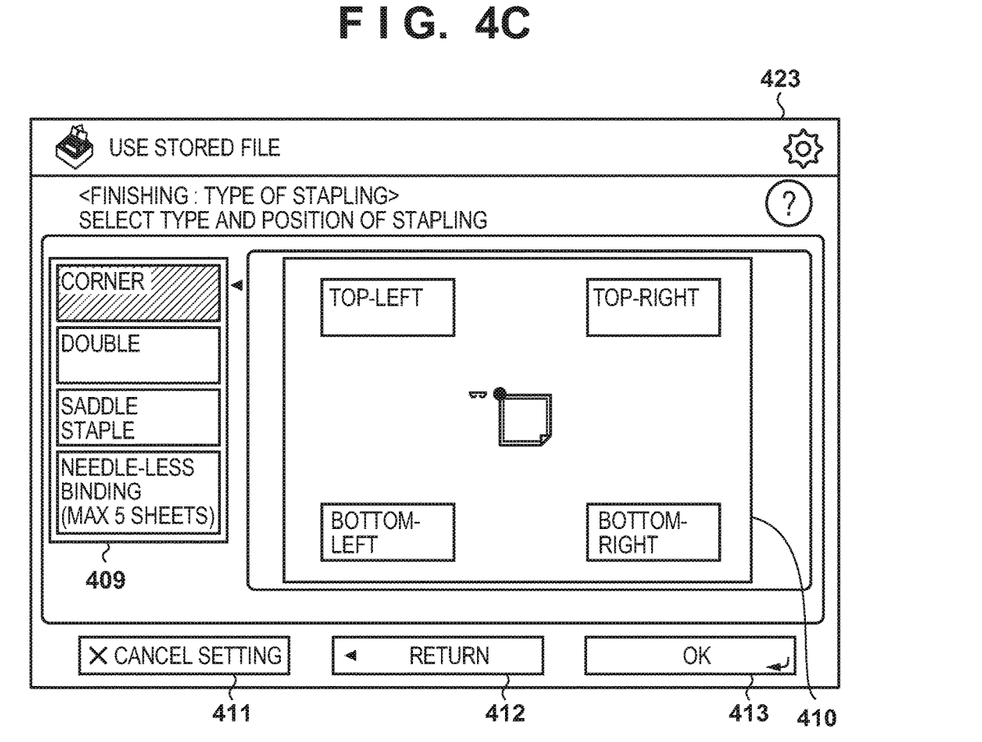
FIG. 4C is a view illustrating an example of a staple type setting screen.

Next, with reference to FIG. 4A to FIG. 4C, description will be given regarding an example of a print screen of a time when saved print data is printed. Reference numeral 421 is an example of a main screen for printing which is displayed when a user selects via the touch panel 118 a specific saved job from a saved job selection screen (not shown) displayed on the display 119, and presses a button for performing print settings. At least a finishing setting button 401, a delete file after printing button 402, a cancel button 403, and a print initiation button 404 are included on a main screen for printing 421. Information set by the main screen for printing 421 is used in the print processing and the post-processing mainly as print information. A stapling setting can be performed on the screens of reference numerals 422 and 423 described later when the finishing setting button 401 is pressed. The delete file after printing button 402 functions as a reception unit, and a saved job (print data) which was printed is deleted after the end of the print processing corresponding to the saved job by pressing this button. The main screen for printing 421 can be closed by pressing the cancel button 403 in a case when a print of a saved job is not performed. A print of a saved job is started by pressing the print initiation button 404 after a print setting is performed.

The reference numeral 422 is an example of a finish setting screen displayed when a user presses the finishing setting button 401 on the main screen for printing 421. Information set by the finishing setting screen 422 is used in print processing and post-processing mainly as post-processing information. Reference numeral 405 is a finishing function selection button and a selection of functions of sort, group, staple and sort, and staple and group is possible. Reference numeral 406 is a setting cancellation button, and a finishing setting is cancelled, and the main screen for printing is returned to by a user pressing this button in a case when it is desired to disenable the finishing setting. Reference numeral 407 is a return button, and by a user pressing it in a case when the originally set finishing setting is not changed, the main screen for printing 421 is returned to leaving the already set finishing setting as enabled. Reference numeral 408 is a next button, and detailed setting of the stapling becomes possible by it being pressed after a stapling function is selected by the finish function selection button 405.

Reference numeral 423 is an example of a staple type setting screen displayed when a user presses the next button 408 after selecting a stapling setting by the finish function selection button 405 on the finishing setting screen 422. Reference numeral 409 are staple type selection buttons, and selection of corner stapling, double stapling, saddle stitching, and needle-less stapling is possible. Reference numeral 410 is a position selection button, and the selectable position differs according to the type of staple designated by the staple type selection buttons 409. For example, if it is corner, either the top-left, the bottom-left, the top-right, and the bottom-right is selectable. Reference numeral 411, similarly to reference numeral 406, is a setting cancellation button, and a finishing setting is cancelled, and the main screen for printing 421 is returned to by a user pressing this in a case when it is desired to disenable the finishing setting. Reference numeral 412 is a return button, and the finishing setting screen 422 is displayed by a user pressing it. Reference numeral 413 is an OK button, and a designated staple type and staple position setting is enabled and the main screen for printing 421 is returned to by a user pressing it.

<Processing Procedure>

Figure 5A:
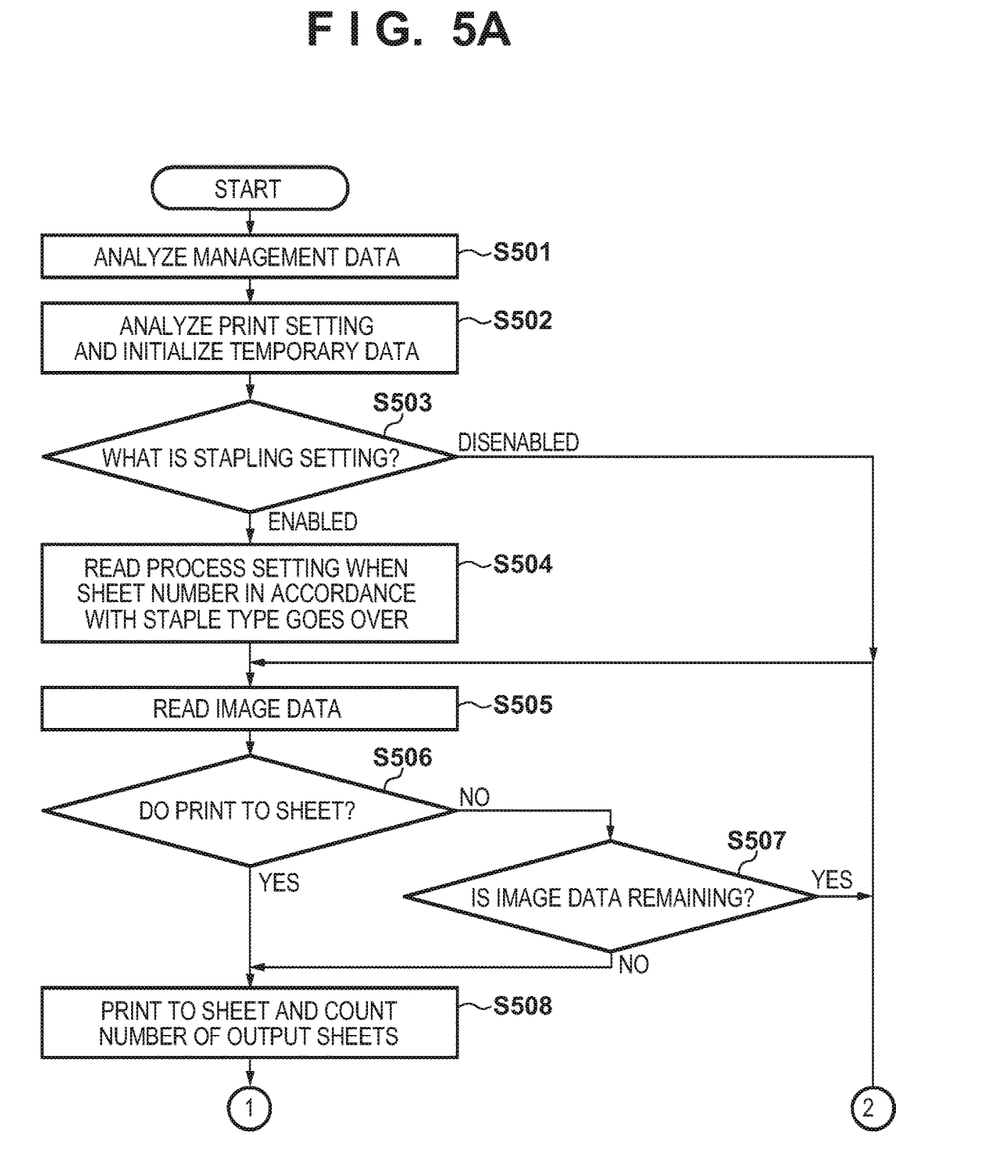
FIGS. 5A and 5B are flowcharts of a print job for printing data saved in a storage apparatus.
Figure 5B:
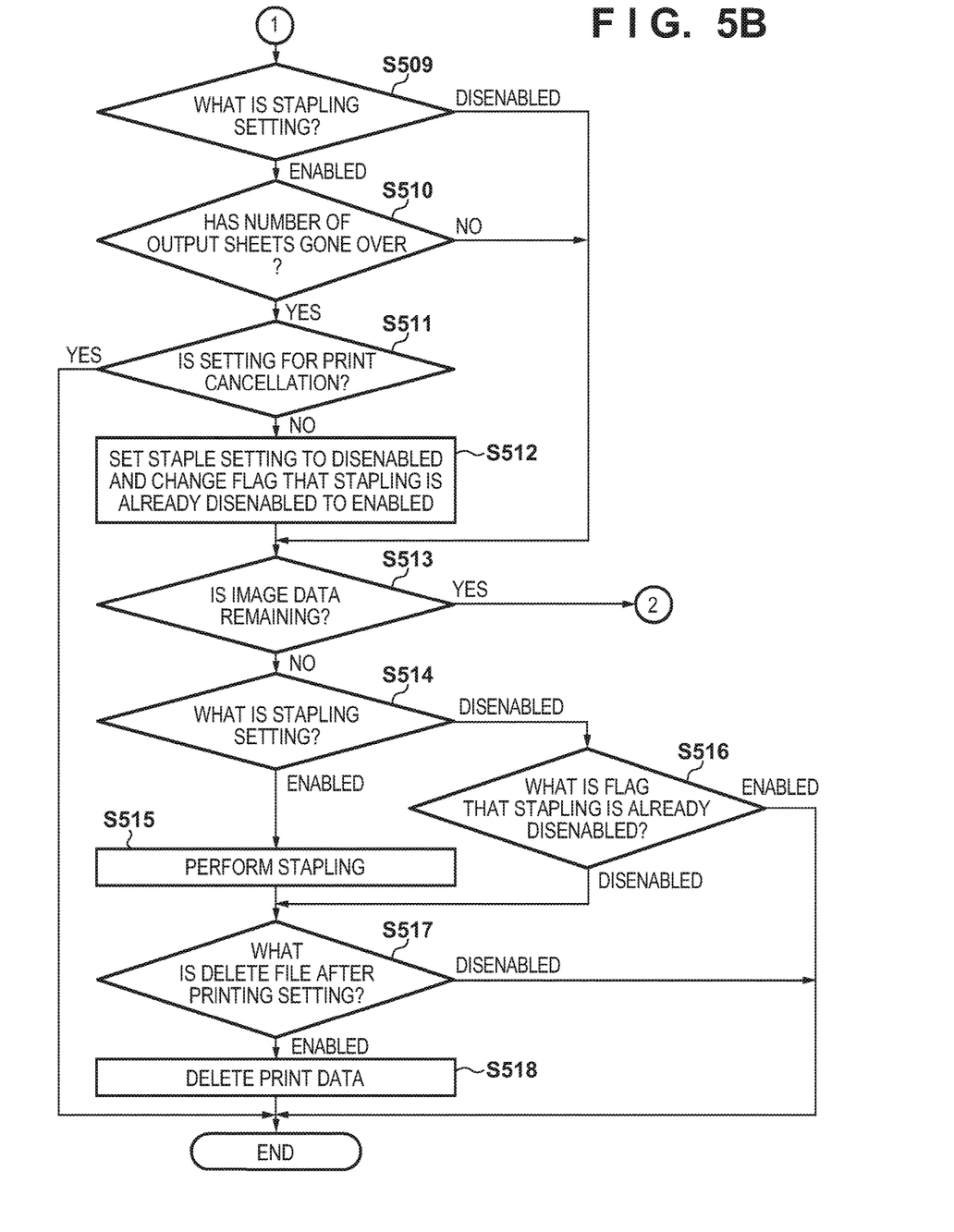

Next, with reference to FIGS. 5A and 5B, description will be given regarding a processing procedure of a print job for printing print data saved in the storage apparatus 120 having considered each print setting. The processing described hereinafter is realized by the CPU 111 reading a control program stored in the storage apparatus 120 such as the ROM 113 or a hard disk to the RAM 112 as necessary and executing it. Also, the processing procedure hereinafter is started by a user selecting specific data from data displayed on the touch panel 118 and performing a print instruction via the screens illustrated in FIG. 4A to FIG. 4C.

In step S501, the CPU 111 analyzes management data of the saved print data and specifies image data of a printing target. In step S502, the CPU 111 analyzes a print setting set at a time of a print operation and initializes temporary data according to a user. The temporary data is saved on the RAM 112, there exists a number of output sheets, a stapling already disenabled flag, and the like, the number of output sheets is made to be 0 as an initialization process, and the stapling already disenabled flag is made to be disenabled.

In step S503, the CPU 111 determines whether or not the stapling setting is enabled in the print setting. In a case when the stapling setting is enabled the processing proceeds to step S504 and in a case when it is disenabled the processing proceeds to step S505. In step S504, the CPU 111 obtains information in accordance with the staple type according to the processing setting table in a case when the stapling sheet number has exceeded the upper limit sheet number, stores this to the RAM 112, and proceeds to step S505.

In step S505, the CPU 111 reads one page of the image data saved in the storage apparatus 120 and stores this to the RAM 112. Next in step S506, the CPU 111 determines whether or not the image data will be printed on paper. A function such that a plurality of image data is laid out on one page of paper is set, it is determined to not print on the paper in a case when the laying out has not been finished yet, and the processing proceeds to step S507. In step S507, the CPU 111 determines whether or not unread printing target image data remains, and returns the processing to step S505 in a case when data remains, and again reads image data.

Meanwhile, in a case when it is determined to print on paper in step S506 or in a case when it is determined that an image to read does not remain in step S507, in step S508, the CPU 111 prints the images read up until that point onto paper in accordance with the print setting and increments the number of output sheets. Next in step S509, the CPU 111 determines whether the stapling setting is enabled or disenabled. In a case when it is enabled, the processing proceeds to step S510, and the CPU 111 determines whether or not the number of output sheets exceeds the staple-able upper limit sheet number. In a case when the staple-able upper limit sheet number is exceeded the processing proceeds to step S511, and if that is not the case the processing proceeds to step S513.

In step S511, the CPU 111 determines whether or not the setting is for print cancellation in a case when the upper limit sheet number is exceeded, and ends the print job processing in the case of print cancellation. If that is not the case the processing proceeds to step S512, and the CPU 111 sets the stapling setting to disenabled, changes the stapling already disenabled flag to enabled, and proceeds to step S513.

After the execution of step S512, in step S513, the CPU 111 determines whether or not image data of the printing target which is not read remains in a case when the stapling setting is disenabled in step S509 or in a case when the number of output sheets does not exceed the upper limit sheet number in step S510. In a case when it is determined that data remains, the processing returns to step S505 and an image is read again. Meanwhile, in a case when it is determined that data does not remain the processing proceeds to step S514, and the CPU 111 determines whether or not the stapling setting is enabled. In a case when the stapling setting is determined to be enabled the processing proceeds to step S515 and in a case when it is determined to be disenabled the processing proceeds to step S516.

In step S515, the CPU 111 executes the stapling processing (stapling) to the output paper. Meanwhile, in a case when the stapling setting is disenabled in step S514, in step S516, the CPU 111 determines whether or not the stapling already disenabled flag is enabled. If disenabled, the processing proceeds to step S517 and if enabled the processing ends.

In step S517, the CPU 111 determines whether or not a delete file after printing setting which is included in the print setting is enabled after the execution of stapling in step S515 or in a case when the stapling already disenabled flag is disenabled in step S516. In a case when the deletion setting is enabled the processing proceeds to step S518, and in a case when it is disenabled the processing ends. In step S518, the CPU 111 deletes the print data and ends the processing. After the execution of step S518, processing of the print job ends in a case when the stapling already disenabled flag is enabled in step S516 or in a case when the deletion setting is disenabled in step S517. Here, in a case when the stapling already disenabled flag is enabled in step S516, it is a case where the stapling setting is cancelled although printing of all of the image data has completed, and in such a case, the printing is treated as incomplete and step S517 and step S518 are not executed. Specifically, according to the present embodiment by controlling in this way, configuration may be taken such that deletion of the saved print data is restricted, and an operator is enabled to change the setting and use the saved print data to execute a print again.

<Output Results>

Next, with reference to FIG. 6A to FIG. 6E, description will be given regarding an output result after several print jobs are executed according to the processing procedure described in FIGS. 5A and 5B. In reference numeral 621, for a document 601 which is used in the print job, the number of pieces of image data is 60, in a print setting 602 configuration is made for single sided printing, an all image data printing target, a stapling (corner) designation, and delete file after printing setting enabled, and corner/double of a setting 603 for when the number of sheets is exceeded is print cancellation. For a print result 604 according to the embodiment, when a print is executed by those settings the number of output sheets is 50, and the printing ends without all of the image data being printed where stapling (corner) is not executed and also deletion of the file after printing is not executed.

Figure 6A:
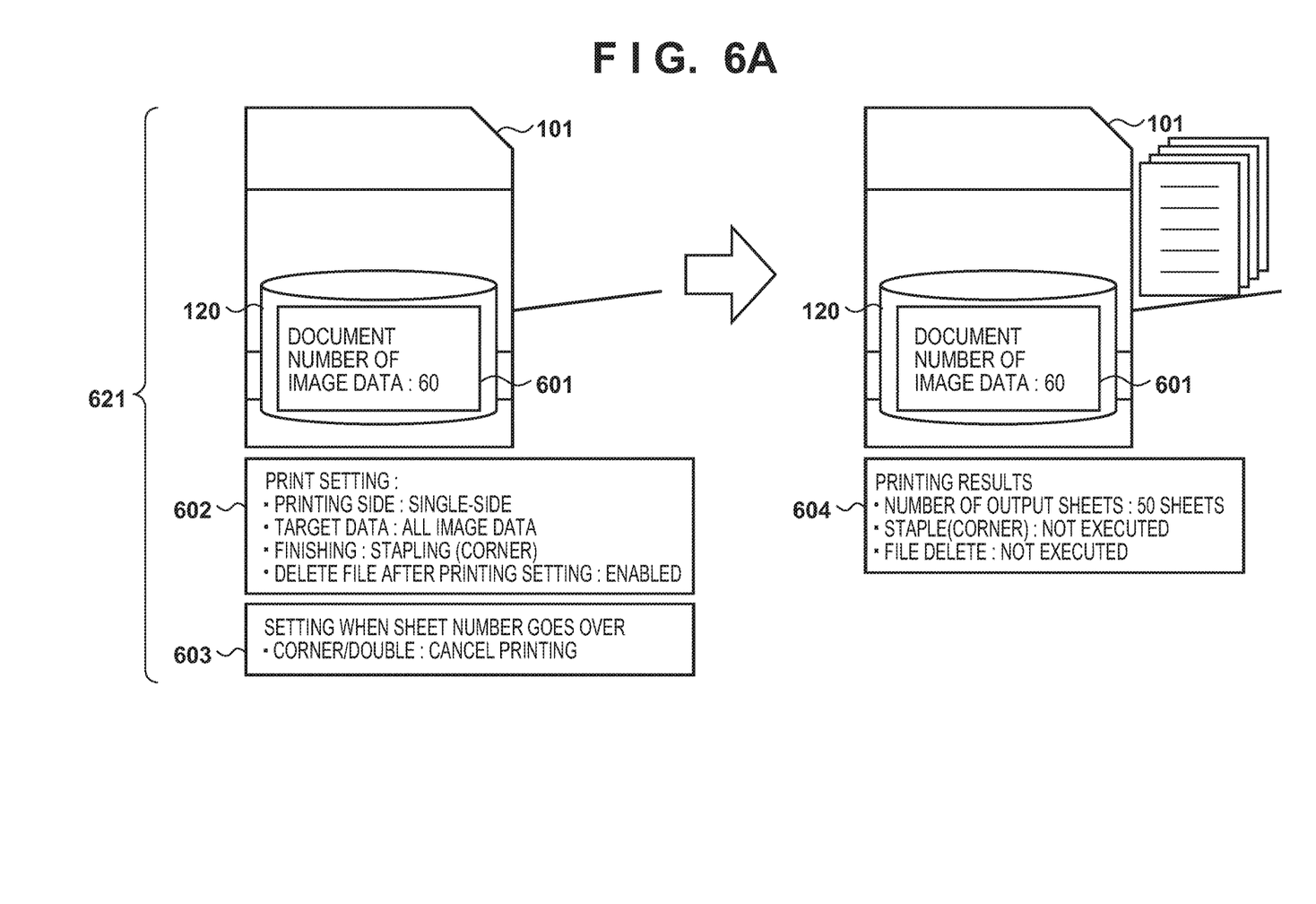
FIGS. 6A to 6C illustrate print settings and output results.
Figure 6B:
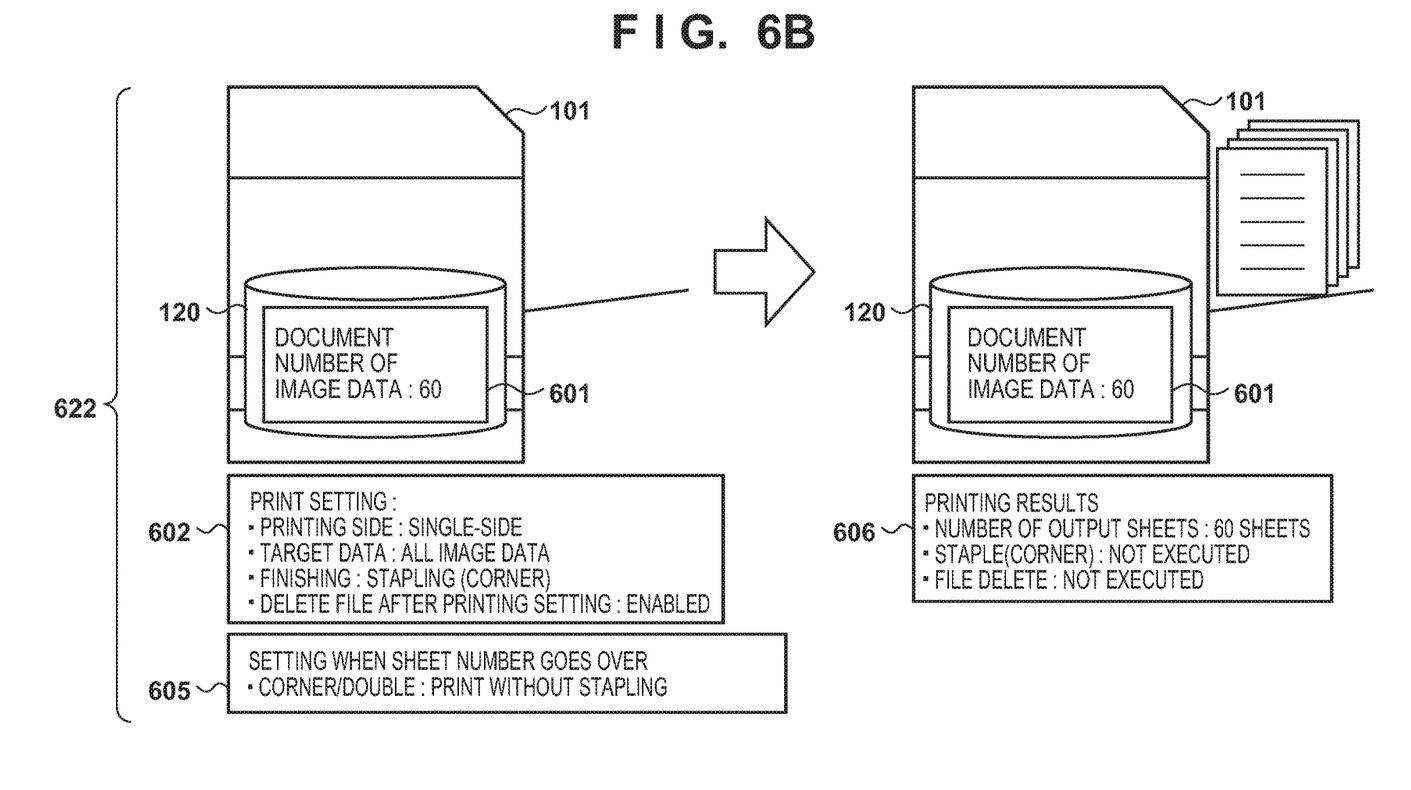

In reference numeral 622, although the document 601 which is used in the print job and the print setting 602 are the same as in reference numeral 621, a setting 605 for when the number of sheets is exceeded is different and corner/double is set to print without stapling. For a print result 606 according to the embodiment, when a print is executed by those settings the number of output sheets is 60, and the printing ends having printed all of the image data where stapling (corner) is not executed and also deletion of the file after printing is not executed.

Figure 6C:
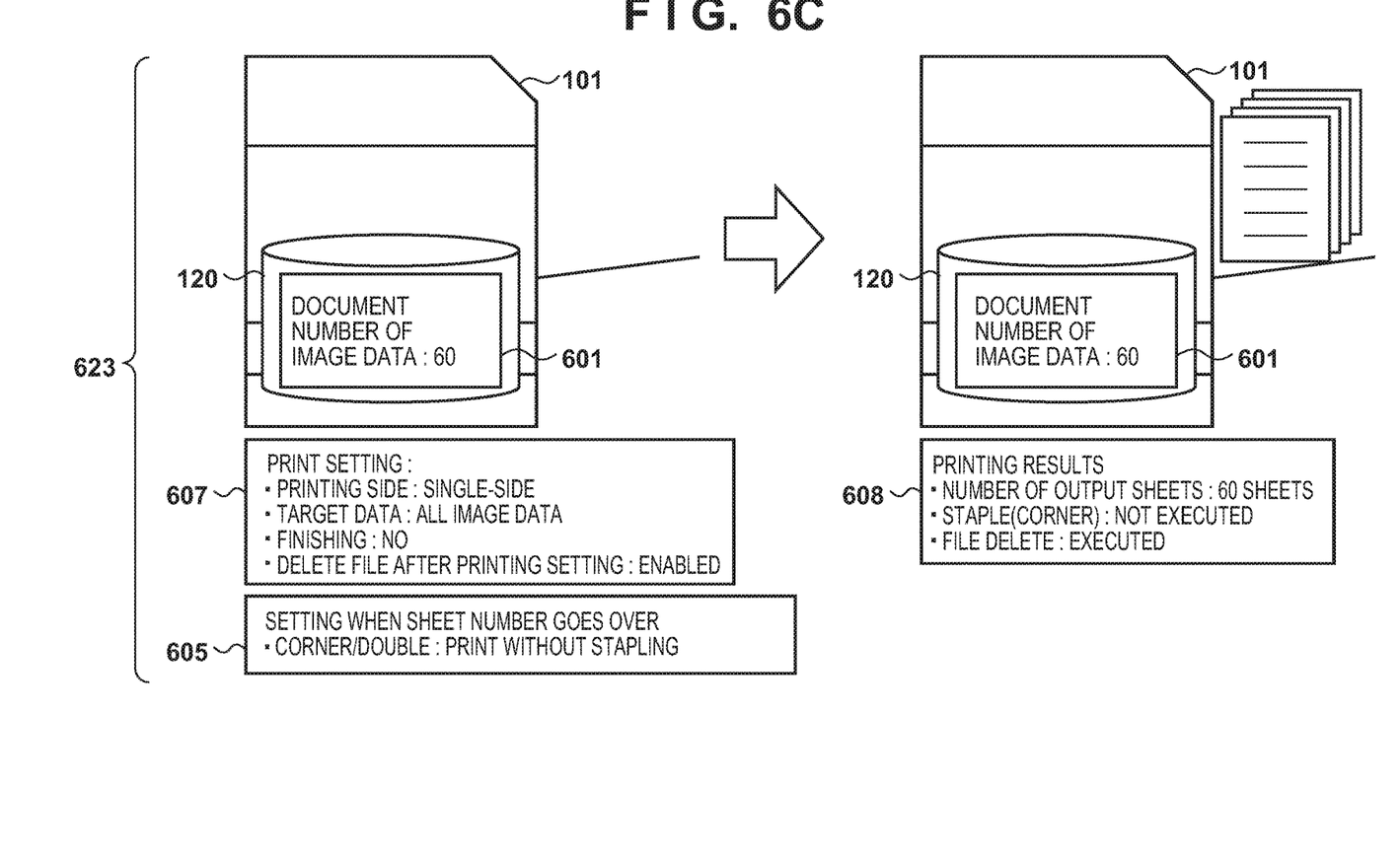

In reference numeral 623, although the document 601 which is used in the print job and the setting 605 for when the number of sheets is exceeded are the same as in reference numeral 622, a print setting 607 is different and there is no finishing. For a print result 608 according to the embodiment, when a print is executed by those settings the number of output sheets is 60, and the printing ends having printed all of the image data where stapling (corner) is not executed since it is not included in the print setting, but deletion of the file after printing is executed.

Figure 6D:
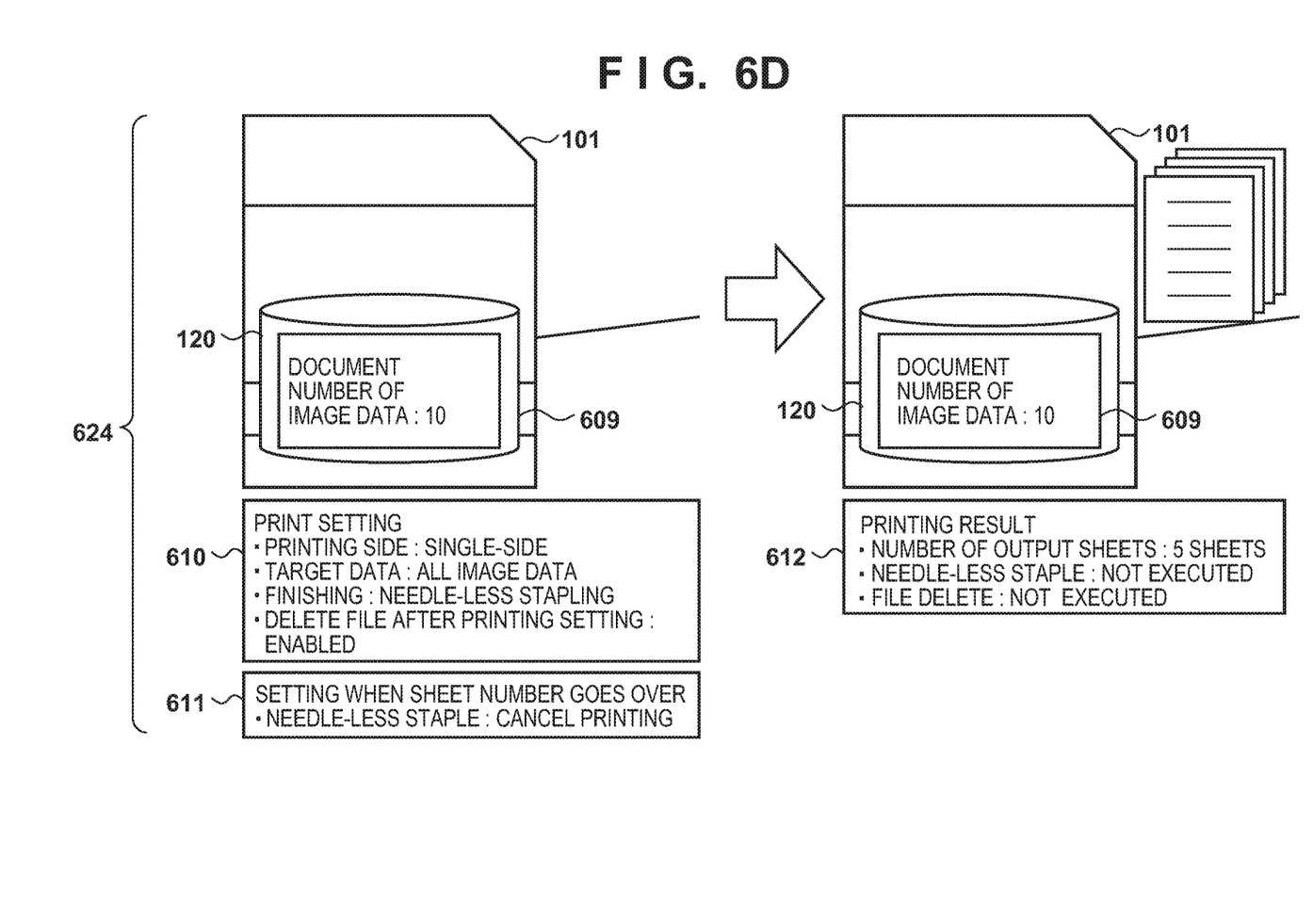
FIGS. 6D and 6E illustrate print settings and output results.

In reference numeral 624, for a document 609 which is used in the print job, the number of image data is 10, and in a print setting 610 the finishing is a needle-less stapling (first processing). Also, the needle-less stapling of a setting 611 when the sheet number is exceeded is a print cancellation. For a print result 612 according to the embodiment, when a print is executed by those settings the number of output sheets is 5, and the printing ends without all of the image data being printed where needle-less stapling is not executed and also deletion of the file after printing is not executed.

Figure 6E:
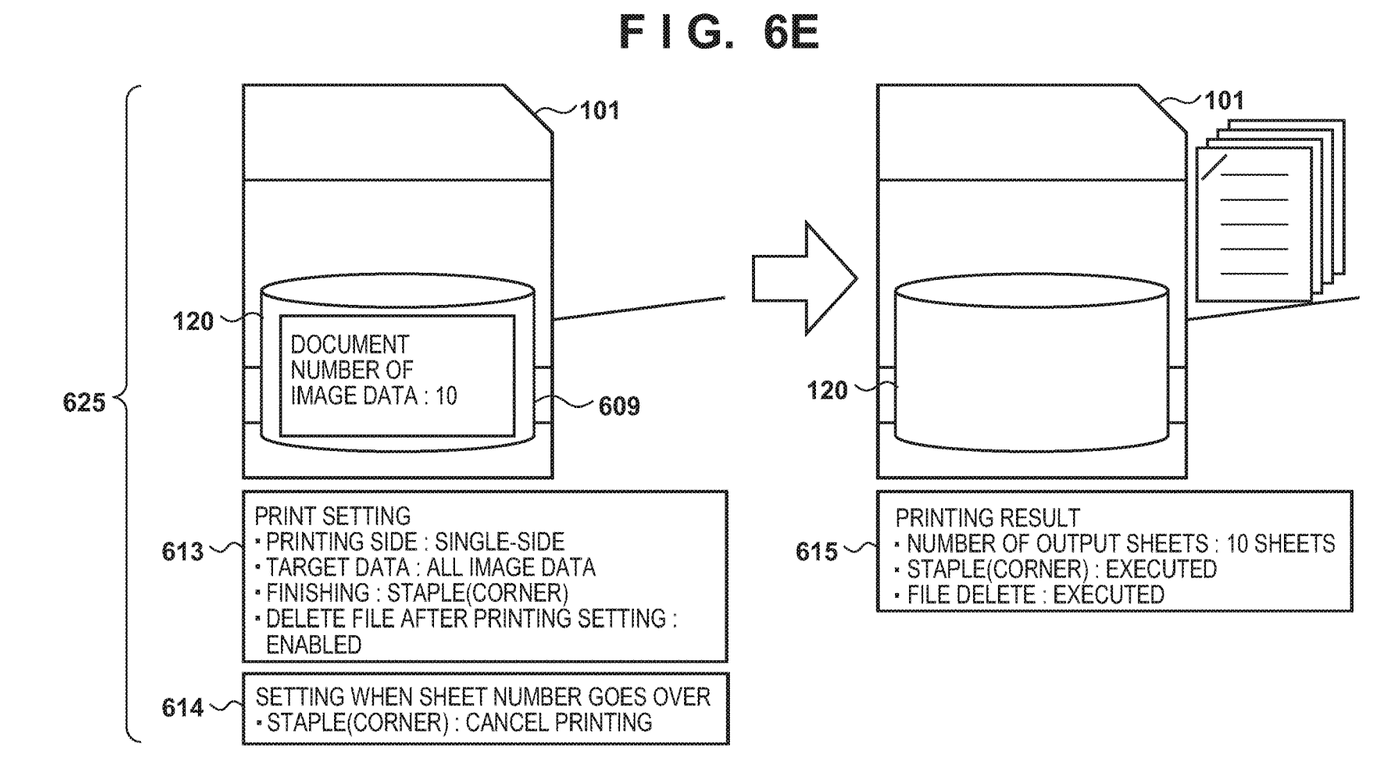

In reference numeral 625, for the document 609 which is used in the print job, similarly to in reference numeral 624, regarding the print setting 613, the finishing is stapling (corner) (second processing). Also, stapling (corner) of a setting 614 for when the sheet number is exceeded is print cancellation. For a print result 615 according to the embodiment, when a print is executed by those settings the number of output sheets is 10, and the printing ends having printed all of the image data where stapling (corner) is executed and also deletion of the file of the document 609 is executed.

As described above, according to the present embodiment, a print apparatus is provided that executes a print using print data that is stored in the apparatus, and in addition to executing post-processing on output materials after the printing, deletes the corresponding print data when processing of the print job ends. Here, the print apparatus according to the embodiment deletes the corresponding print data only in a case when the post-processing to all the sheets or the like set in one print job successfully ends. Thus, security can be ensured while effectively using memory resources in a case when processing up until post-processing has not finished successfully, after that, the operator can change a setting and execute print processing again by using the stored print data. In other words, it is not necessary for the operator to perform storage of the print data again and this enables the processing for a print job to be more efficient, and a desired print material can be easily acquired.

Note, for the present invention various modifications are possible and it is not limited to the embodiments described above. For example, although mainly a stapling function is described in the above-described embodiment, the present invention is not limited to this, and at the least application to post-processing such as punching, binding processing, folding processing, sheet cutting processing, and the like is possible. In a case in which these are applied to the post-processing, the same control as the case of the stapling can be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-242648 filed on Dec. 11, 2015, which is hereby incorporated by reference herein in its entirety.

What is claimed is:

1. An image processing apparatus that uses a storage device to store data, an image forming device to perform print processing that performs an image formation on a sheet, a display device to display information, and a stapler device to staple a plurality of print processed sheets, comprising:
   a controller, having a processor that executes instructions stored in a memory or having circuitry, configured to:
      cause the display device to display an instruction screen including i) an object for starting print processing based on print data stored in the storage device, ii) an object for performing setting related to a post processing to be performed, and iii) an object for performing setting related to automatic deletion of print data after performing the print processing;
      cause the image forming device to start print processing in accordance with a print instruction for starting printing input on the displayed instruction screen;
      control the stapler device so as to not perform stapling for print processed sheets in a case where starting of the print processing is instructed and a state in which stapling has been set as the post processing via the instruction screen, and image formation is performed on sheets that exceed a predetermined number of sheets, and control the stapler device so as to perform stapling for print processed sheets in a case where the starting of the print processing is instructed and the state in which the stapling has been set as the post processing via the instruction screen, and image formation is performed on sheets that does not exceed the predetermined number of sheets; and
      control the storage device to delete, in accordance with completing of the stapling, print data for which the stapling and automatic deletion have been set via the instruction screen and the stapling was performed, and control the storage device not to delete print data for which the stapling and automatic deletion have been set via the instruction screen and the stapling was not performed.

2. The image processing apparatus according to claim 1, wherein the controller is further configured to:
   cause the storage device not to delete the print data after completion of print processing in accordance with the print instruction in which automatic deletion is not designated.

3. The image processing apparatus according to claim 2, wherein the controller is further configured to:
   cause, based on print processing according to the print instruction in which automatic deletion is designated to complete prior to performance of image formation on sheets that exceed a predetermined number of sheets, the stapler device not to perform stapling processing and cause the storage not to delete the print data.

4. The image processing apparatus according to claim 1, wherein the controller is further configured to:
   accept, based on the print instruction not being completed even though image formation is performed on sheets exceeding a predetermined number of sheets, whether to continue print processing without performing stapling processing or to cancel print processing.

5. The image processing apparatus according to claim 4, wherein the controller is further configured to:
   cause, if the print instruction, which is for cancelling print processing based on the print instruction not being completed even though image formation is performed on sheets exceeding the predetermined number of sheets, is accepted, the image forming device to cancel print processing based on the number of sheets to which image formation is performed during preformation of the print processing exceeding the predetermined number of sheets.

6. The image processing apparatus according to claim 5, wherein the controller is further configured to:
   cause, if the print instruction, which is for continuing print processing without performing stapling processing based on the print instruction not being completed even though image formation is performed on sheets exceeding the predetermined number of sheets, is accepted, the image forming device to complete print processing without causing the stapler device to perform stapling based on the number of sheets to which image formation is performed during preformation of the print processing exceeding the predetermined number of sheets.

7. The image processing apparatus according to claim 1, wherein at least a first process and a second process in which a number of sheets stapled is greater than in the first process are included in the stapling processing,
   and the controller is further configured to:
   use the print data stored in the storage device, switch from the first process to the second process, and once again perform the print processing and the stapling processing.

8. A method of controlling an image processing apparatus that uses a storage device to store print data, an image forming device to perform print processing that performs an image formation on a sheet, a display device to display information, and a stapler device to staple perform a plurality of print processed sheets, wherein
   the method of controlling includes the following processes which are executed by a controller arranged in the image processing apparatus having a processor that executes instructions stored in a memory or having circuitry:
   cause the display device to display an instruction screen including i) an object for starting print processing based on print data stored in the storage device, ii) an object for performing setting related to a post processing to be performed, and iii) an object for performing setting related to automatic deletion of print data after performing the print processing;
   cause the image forming device to start print processing in accordance with a print instruction for starting printing input on the displayed instruction screen;
   control the stapler device so as to not perform stapling for print processed sheets in a case where starting of the print processing is instructed a state in which stapling has been set as the post processing via the instructions screen, and image formation is performed on sheets that exceed a predetermined number of sheets, and control the stapler device so as to perform stapling for print processed sheets in a case where the starting of the print processing is instructed and the state in which the stapling has been set as the post processing via the instruction screen, and image formation is performed on sheets that does not exceed the predetermined number of sheets; and control the storage device to delete, in accordance with completing of the stapling, print data for which the stapling and automatic deletion have been set via the instruction screen and the stapling was performed, and control the storage device not to delete print data for which the stapling and automatic deletion have been set via the instruction screen and the stapling was not performed.

9. A non-transitory computer-readable storage medium storing a program for causing a computer to execute each step of a method of controlling an image processing apparatus that uses a storage device to store print data, an image forming device to perform print processing that performs an image formation on a sheet, a display device to display information, and a stapler device to staple a plurality of print processed sheets, wherein the method of controlling includes the following processes which are executed by a controller arranged in the image processing apparatus having a processor that executes instructions stored in a memory or having circuitry:

cause the display device to display an instruction screen including i) an object for starting print processing based on print data stored in the storage device, ii) an object for performing setting related to a post processing, and iii) an object for performing setting related to an automatic deletion of print data after the print processing;

cause the image forming device to start print processing in accordance with a print instruction for starting printing input on the displayed instruction screen;

control the stapler device so as to not perform stapling for print processed sheets in a case where starting of the print processing is instructed and a state in which stapling has been set as the post processing via the instruction screen, and image formation is performed on sheets that exceed a predetermined number of sheets, and control the stapler device so as to perform stapling for print processed sheets in a case where the starting of the print processing is instructed and the state in which the stapling has been set as the post processing via the instruction screen, and image formation is performed on sheets that does not exceed a predetermined number of sheets; and control the storage device to delete, in accordance with completing of the stapling, print data for which the stapling and automatic deletion have been set via the instruction screen and the stapling was performed, and control the storage device not to delete print data for which the stapling and automatic deletion have been set via the instruction screen and the stapling was not performed.

* * * * *